Oct. 28, 1952     R. W. FLEWELLING     2,615,649
BELT TYPE SPINNING REEL
Filed July 26, 1949     2 SHEETS—SHEET 1
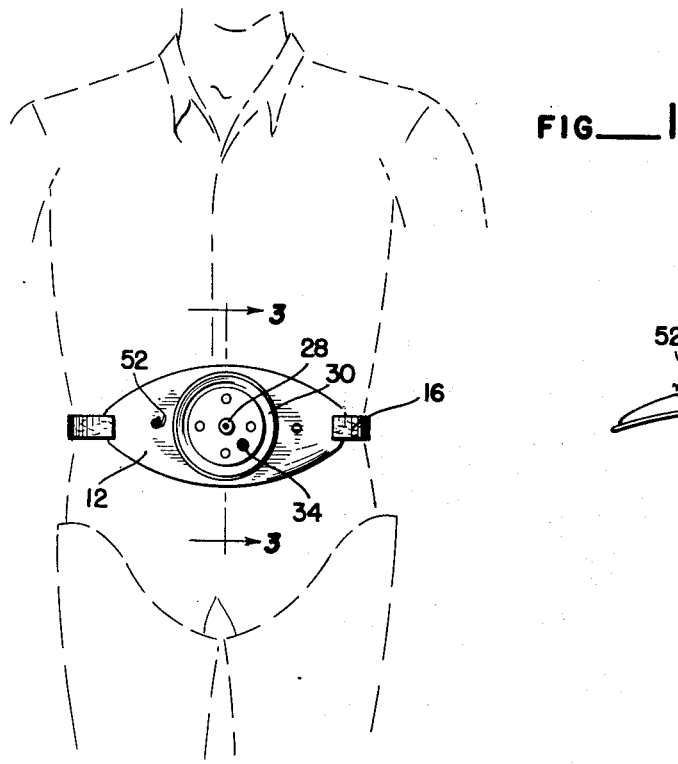
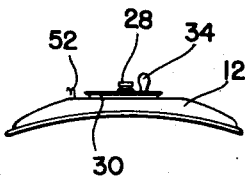
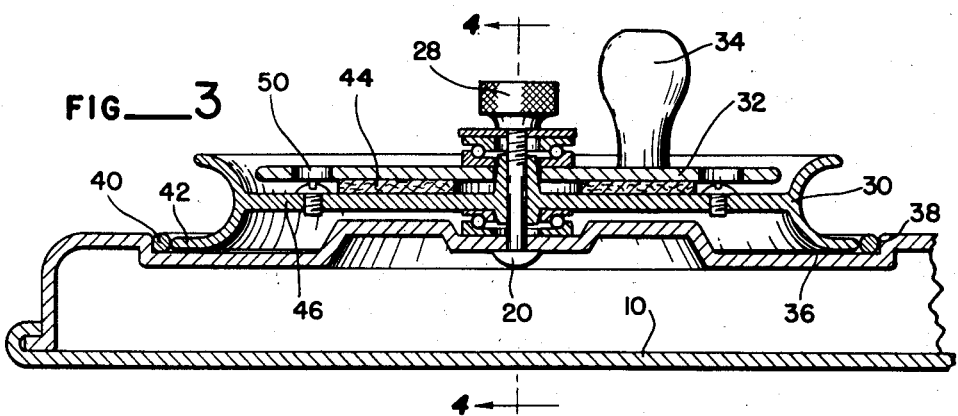
ROBERT W. FLEWELLING
Inventor
By Smith & Tuck
Attorneys

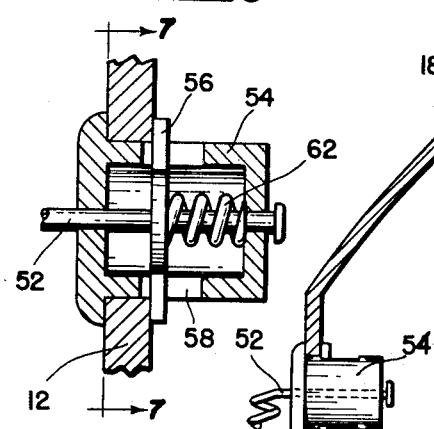
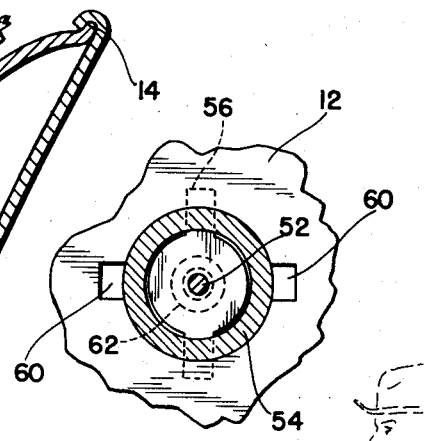
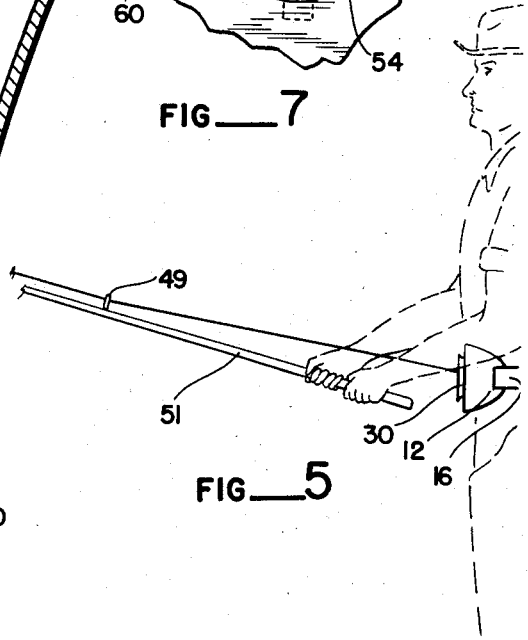
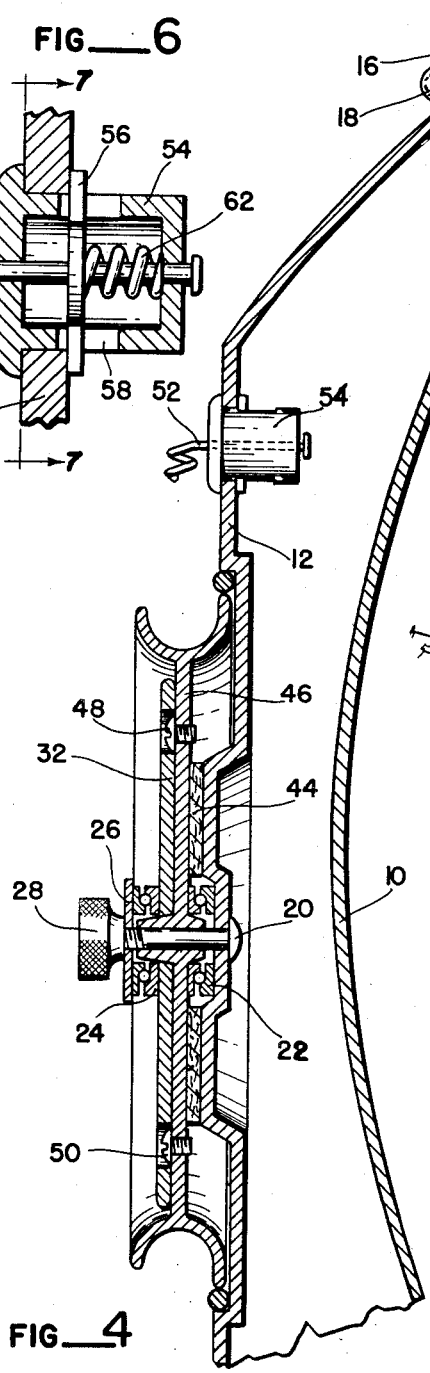

Patented Oct. 28, 1952

2,615,649

UNITED STATES PATENT OFFICE 2,615,649

BELT TYPE SPINNING REEL

Robert W. Flewelling, Tacoma, Wash.

Application July 26, 1949, Serial No. 106,879

5 Claims. (Cl. 242—96)

My present reel is of the type that lends itself particularly well to casting by the methods formerly referred to as spinning, wherein the guide nearest the hand on the fishing pole is positioned substantially upon the axis of revolution of the reel spool, and, in this manner, the line is payed out off the rim of the spool while it is stationary. There have been many spinning reels produced in the past, however mine is characterized by being arranged for use particularly in salt water and river fishing where a large amount of relatively heavy line may be needed.

This present invention contemplates a reel that will have wide application to various types of fishing, and interchangeable means are provided so that the reel can be quickly changed for the two general styles of fishing, namely: the spinning type of casting where relatively small or medium sized fish are sought and, on the other extreme, for trolling and the like, or even some forms of casting where large fish are caught.

The principal object of my present invention, therefore, is to provide a belt-type spinning reel which can be made of a size to carry a long length of reasonably heavy line and make all the desirable characteristics of spinning reels available to the man who wishes to employ it under conditions requiring heavier tackle than the spinning reel admits of.

A further object of my invention is to provide a belt type reel in which the user has immediately available to him means for quickly converting the reel from one type of fishing to the other.

A further object of my invention is the provision of a reel which can be made in larger sizes and still be made very economically, in that the parts which make up my device do not require the precision machine work so often encountered in fishing reels, particularly in the larger sizes.

A further object of my invention is to provide a friction member which may be employed, either between the drive and the reel spool or, for other types of fishing wherein the drive and spool are joined together, the friction element is between the combined assembly and the face which is fixed on the plate bearing on the fisherman's body.

Further objects, advantages and capabilities will be apparent from the description and disclosure in the drawings, or may be comprehended, or are inherent in the device.

In the drawings:

Figure 1 is a front elevation of my reel showing the normal position of use on a fisherman's body, which body is shown in dashed lines.

Figure 2 is a top plan view of my reel on the same general scale, as shown in Figure 1.

Figure 3 is a cross-sectional view taken substantially along the line 3—3 of Figure 1.

Figure 4 is a cross-sectional view taken at right angles to the view of Figure 3, so as to better illustrate the reel supporting plate.

Figure 5 is an elevational view showing the association of a fishing rod with my reel.

Figure 6 is a cross-sectional view of the movable line guide.

Figure 7 is a cross-sectional view taken along the line 7—7 of Figure 6.

Referring more particularly to the disclosure in the drawings, the numeral 10 designates the supporting frame for my reel and, as will be noted, from a study of Figure 1, has considerable longitudinal extent and is curved inwardly to more readily accept the normal waistline conformation of the human body. Secured to the supporting plate is the base plate 12. In Figure 4, I have illustrated, at 14, one of the preferred arrangements for securing these two members together. The reel assembly is held in place by a belt passing around the waist of the fisherman, and this belt is secured to, preferably, the bearing plate by metal loops 18, disposed one on each side of the reel.

Centrally disposed, with respect to the bearing plate, is the spool securing pin or spindle 20. This member should be, preferably, fixedly secured to base plate 12, or it may be configured near the head of the pin, after the fashion of the square shouldered carriage bolt plan. It is important that it be held against rotation.

Coaxially disposed about spindle or bolt 20, are the spaced, supporting anti-friction bearings, as 22 and 24. These are retained in proper bearing relationship by cover plate or washer 26, upon which the adjusting nut 28 is caused to bear.

Disposed for revolution on bearings 22 and 24, is the reel spool 30, and the drive plate 32, to which the operating handle 34 is normally fixedly secured. Spool 30 seats in an annular recess 36, encircling spindle 20, and the space between the reel spool and the shoulder, as 38, formed in the base plate 12, is taken up with, preferably, a brush-like ring 40. One preferred form of such a ring is made of twisted wire in which cotton tufting is secured very similar to the so-called pipe cleaner, which is in quite common use. This arrangement, in the general proportions, as shown in Figures 3 and 4, provides quite definitely against the line ever getting underneath spool 30, where it would become very seriously tangled. It will be noted that the ring washer 40 is normally raised above the inner surface 42 of spool 30, so that the line, in passing over the soft bristles, will naturally come to rest well within the confines of the spool.

In order to adapt my reel to the style of fishing desired by the user, I have shown, in Figures 3 and 4, two optional ways in which the parts of my reel can be assembled. In Figure 3, it is to be noted that the spool 30 is free to revolve and is stabilized by bearings 22 and 24. This is the form of assembly where spool turning long casts are desired, or in trolling, where it is desired to pay out line to a definite length. Under such conditions, it is found best to employ the frictional washer 44 in between the web 46 of spool 30 and plates 32, thus, the operator having once adjusted the frictional engagement between the two members, can, by holding handle 34, allow a heavy fish to take out line if he surges, rather than run the danger of having the line part. In other such conditions, adequate adjustment of the centrally disposed knurled nut 28, gives him full control. This is particularly desirable when handling a heavy fish, or in trolling and such ways of fishing.

In Figure 4, on the other hand, I have illustrated the frictional washer 44 as resting upon bearing plate 12, and engaging the under side of web 46. Under such conditions there will always be a certain amount of constant drag imposed upon the spool, so that it will not be free running. This is a preferred arrangement where spinning is done, as in such fishing the line is taken off in loops by tension along the axis of rotation of the reel, and it is desirable that the spool itself remain stationary.

Figure 4 also illustrates another modification in the manner of using my equipment, in that I have provided a plurality of studs, detents, or screws as 48, which in the showing of Figure 4, are adapted to seat within openings 50 provided in plate 32. The screws or other means employed in lieu of the same, should have sloping sides, after the showing of the screws of Figure 4.

When sloping surfaces are provided for each of the screws, or detents 48, then by suitable adjustment of nut 28 we have, in effect, an overload clutch arrangement, in that, the friction disc 44, which is normally of quite resilient material, will under load, permit plate 32 to press the spool web 46 downwardly, and thus pass over the screw heads. This adjustment, once understood, can be very easily achieved as experience has proved, and provides, not only an escapement, for extra loading, as when handling a big fish, but it definitely provides a click arrangement, all in a very simple manner.

While it has been deemed desirable to explain the functioning of the two assembly arrangements of Figure 3 and 4 separately, various combinations can be made of these arrangements. It has been found, for instance, that the form in Figure 3 can be adjusted to the point where the resilient friction disc 44 can be compressed so that the screws there will engage in opening 50, and give the clutching action or release and click action as previously explained.

In order to use my reel effectively for spinning, the user must acquire a reasonable degree of dexterity. All spinning, of the type where we think of the loops of line as slipping off of the end of the stationary reel, must be achieved with the minimum of friction, and in order to make it satisfactory for my type of reel, it then becomes incumbent upon the user of the equipment to acquire the knack of holding his pole, during the cast, so that the pole is substantially on the axis of rotation of the reel. Naturally, this can hardly be accurately achieved, but it is possible with reasonable experience to have the first, or large guide 49 of the pole 51 substantially on this axis of rotation, as illustrated in Figure 5, and under such conditions the maximum distance of cast can be achieved. This reel, when used in this manner, has the same desirable character of the ordinary light weight spinning reels, in that the spool, being stationary, cannot over run the line, and there is no danger of back-lashing, or tangling the line, as a result thereof.

Where the cast has been made and the fisherman wishes to retrieve his lure, he grasps handle 34 and introduces his line into the pig-tailed guide 52. I have shown only one such guide, however the guide should be positioned on the side opposite from the hand that the fisherman uses to reel in his lines, so that there will be no interference. As the fisherman reels in his line, then the line passes from the pole through guide 52, which is accurately aligned on the central plane of spool 30, thus accurate spooling of the line will result.

In manufacture, in order to accommodate my equipment to commercial ends, I have preferred to provide guide 52 as removable through means of the bushing arrangement shown at 54, so that it may be employed on either side of the spool. Referring to Figures 6 and 7, guide 52 passes through holes in each end of bushing 54. Fixedly secured to the shank of guide 52 is the lock bar 56 having ends protruding through slots 58. Slots 60 are formed in bearing plate 12 to permit the passage of the ends of bar 56 in inserting or removing the guide assembly. A compression spring 62 normally locks the unit in place after the unit has been turned from the line of slots 60, either frictionally or grooves or abutments may be employed if fixed positioning is desired.

It is believed that it will be clearly apparent from the above description and the disclosures in the drawings that the invention comprehends a novel construction of belt type spinning reel.

Having thus disclosed the invention, I claim:

1. A belt type spinning reel, consisting of: a base plate; a spool spindle, extending normally from one face of said base plate, and non-rotatively secured to said base plate; said base plate having an annular spool recess formed in said base plate and concentric to said spindle; a large fishing line spool, having an annular line receiving groove and a connecting web, adapted to be seated concentrically in said spool recess; a drive plate, having an operating handle, concentrically disposed on said spindle on the opposite side of said spool from said base plate; a large friction washer mounted on said spindle disposed between said spool web and said drive plate; two spaced bearings on said spindle, one between said spool web and said base plate and one on the outside of said drive plate; a thrust washer and an adjusting nut on the free end of said spindle adapted to co-act to impose pressure on said drive plate, said spool web, said bearings and said friction washer; outwardly directed, beveled drive means disposed on the face of said spool web toward said drive plate; said drive plate having holes therein adapted to engage said drive means for a clicking action under control of said adjusting nut; and line guide means disposed in the plane of said spool.

2. A belt type reel, comprising: a base plate; a spool spindle, disposed normally to one face of said base plate and secured thereto; a large fishing line spool, having an annular line receiving groove and a connecting web, positioned on said spindle; a drive plate, having an operating handle, concentrically disposed on said spindle on the side of said spool opposite said base plate; an adjusting nut mounted on the outer end of said spindle and adapted to impose pressure on said drive plate, said spool web and said base plate; guide means on said base plate disposed in the plane of said spool for guiding line during the winding of line onto said spool; and said drive plate and connecting web having coacting beveled detents and openings adapted to produce adjustable overload clutching between said drive plate and said connecting web and providing clicking means depending upon the adjustment of said adjusting nut.

3. A belt type spinning reel, comprising: a base plate; a spool spindle having one end secured to one face of said base plate and disposed normally thereto; said base plate having an annular spool recess formed therein disposed concentric to said spindle; a large fishing line spool positioned on said spindle and seated in said annular recess, said spool having an annular line receiving groove and a connecting web, the edge of said groove adjacent said base plate being protected by the walls of said recess to avoid entanglement of line between said spool and said base plate; a drive plate positioned on said spindle on the side of said spool opposite said base plate; a plurality of beveled drive detent members disposed on the face of said spool toward said drive plate and said drive plate having an equal number of openings in which said drive members are seated; a first anti-frictional bearing positioned between said base plate and said spool; a resilient friction braking disc positioned between said spool and said base plate and encircling said first bearing; an adjustable nut and a thrust washer on the free end of said spindle; a second anti-frictional bearing positioned between said drive plate and said thrust washer, whereby through pressure applied by said nut said drive plate and said spool will travel together through coaction of said beveled drive members and openings, and, when sufficient force is applied to said spool by a line thereon, said friction disc will be compressed against said base plate to the point that said beveled drive members will slip out of said openings thereby performing an overload clutching function and providing a click arrangement; an operating handle for said drive plate; and a line guide positioned on said base plate and disposed in the plane of said spool.

4. A spinning reel, comprising: a base plate; a spool spindle having one end secured to one face of said base plate and disposed normally thereto; a fishing line spool positioned on said spindle, said spool having an annular line receiving groove and a connecting web; a drive plate positioned on said spindle on the side of said spool opposite said base plate; said spool and said drive plate having therebetween on opposed faces a plurality of beveled drive detent members and opposed openings in which the engaging surfaces of said drive members are seated; a resilient friction braking disc positioned between said spool and said base plate; an adjustable nut on the free end of said spindle, whereby through pressure applied by said nut said drive plate and said spool will travel together through coaction of said beveled drive members and openings, and when sufficient force is applied to said spool by a line thereon, said friction disc will be compressed against said base plate to the point that said beveled drive members will slip out of said openings thereby performing an overload clutching function and providing a click arrangement; an operating handle for said drive plate; and a line guide positioned on said base plate and disposed in the plane of said spool.

5. The subject matter of claim 4 in which said braking disc is removable by disassembly of said nut, drive plate and spool so that said parts may easily be reassembled with said braking disc positioned between said drive plate and said spool in order to adapt the reel for trolling and the like.

ROBERT W. FLEWELLING.

REFERENCES CITED

The following references are of record in the file of this patent:

UNITED STATES PATENTS

| Number | Name | Date |
|---|---|---|
| 996,258 | Kenward | June 27, 1911 |
| 1,028,770 | Moser | June 4, 1912 |
| 1,284,039 | Atwood | Nov. 5, 1918 |
| 1,325,264 | Pemberton | Dec. 16, 1919 |
| 2,126,227 | Stanley | Aug. 9, 1938 |
| 2,428,324 | Worden | Sept. 30, 1947 |
| 2,462,365 | Crawford | Feb. 22, 1949 |
| 2,489,614 | Brikoff | Nov. 29, 1949 |
| 2,500,445 | Worden | Mar. 14, 1950 |
| 2,574,216 | Lindgren | Nov. 6, 1951 |

FOREIGN PATENTS

| Number | Country | Date |
|---|---|---|
| 6,564 | Great Britain | of 1905 |
| 12,082 | Great Britain | of 1884 |
| 136,217 | Great Britain | Dec. 1, 1919 |
| 216,776 | Great Britain | June 5, 1924 |